June 7, 1927.
G. WASHINGTON
FINDING AND FOCUSING DEVICE FOR CAMERAS
1,631,303
Original Filed Feb. 1, 1926
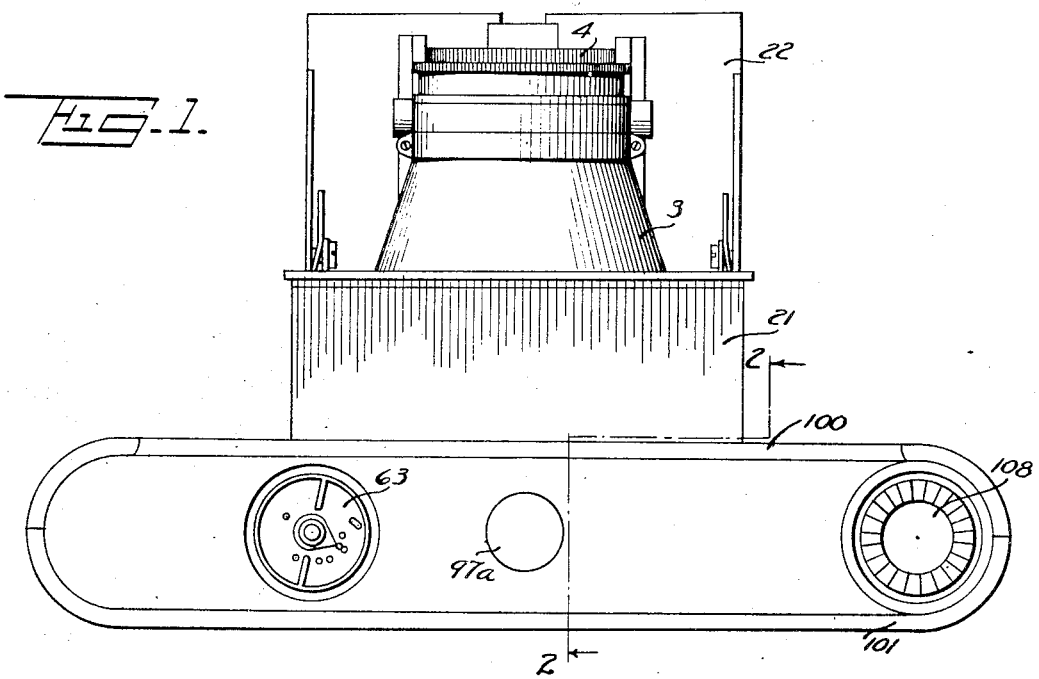
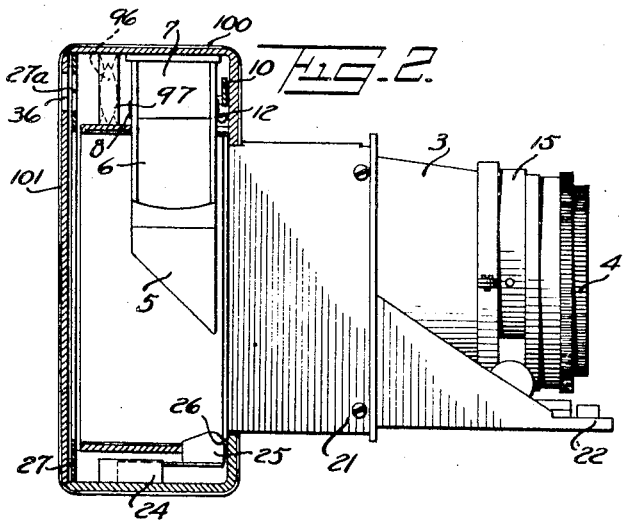
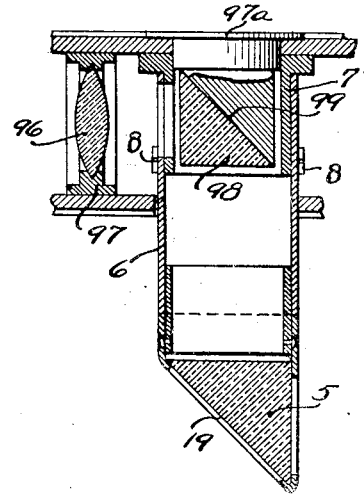
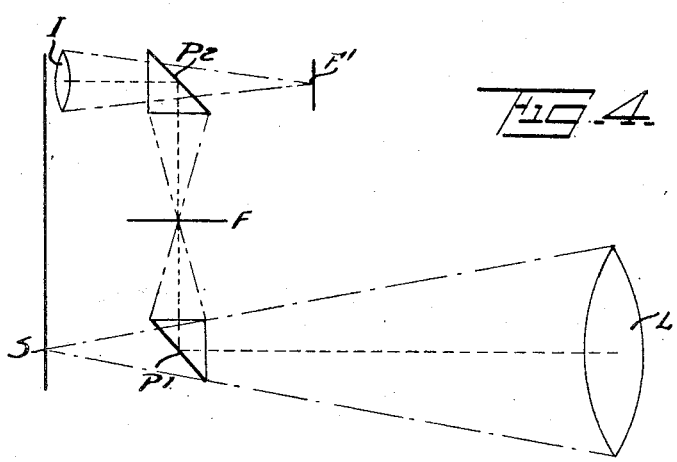
INVENTOR
George Washington
BY
ATTORNEY Patented June 7, 1927.

1,631,303

UNITED STATES PATENT OFFICE.

GEORGE WASHINGTON, OF MENDHAM, NEW JERSEY.

FINDING AND FOCUSING DEVICE FOR CAMERAS.

Original application filed February 1, 1926, Serial No. 85,128. Divided and this application filed January 4, 1927. Serial No. 158,862.

This invention embodies a division of the subject matter of my application Serial No. 85,128, filed February 1, 1926, and relates generally to photographic cameras, but is more particularly designed to produce a special form of simple apparatus for finding the object to be photographed and accurately focusing the objective lens of a camera upon said object without the use of the ground glass plate or other devices heretofore employed. To this end the preferred embodiment of the invention herein shown and described comprises two or more mirror or reflecting surfaces, preferably applied to the faces of glass prisms, at least one of which prisms is carried upon a swinging support in the interior of the camera adapted to be either swung into the focal axis of the lenses or out of the field of the lenses, and means for permitting the operator to view the object through said objective lens as reflected by said mirrors when one of them is in the first above mentioned position. The best form of apparatus at present known to me embodying my invention is illustrated in the accompanying sheet of drawings, in which:

Fig. 1 is a plan view of a camera designed for use with rolls of photographic film.

Fig. 2 is a side elevation and partial longitudinal vertical section on irregular line 2—2 of Fig. 1.

Fig. 3 is an enlarged detail section of the prisms and eye-piece lens used in this embodiment of the invention, and Fig. 4 is a diagram showing the location of the focal planes of the light rays passing through the lenses both during their reflection by two mirrors in the focusing operation and when one or more of said mirrors is removed from the lens fields.

Throughout the drawings like reference characters indicate like parts. 100 represents the main casing with a removable back 101, and 21 is a telescoping section of the casing into which the objective lens 4 and the collapsible hood 3 may be folded. 108 is one of the buttons by which the take-up spool for the film may be operated in the manner illustrated and described in my pending application Serial No. 85,130, filed February 1, 1926, and 63 is a cup-shaped disc for setting and winding the shutter curtains, preferably also of the character described and illustrated in my co-pending application, Serial No. 85,129.

In this construction the rays of light entering through objective lens 4 are reflected upward by the film of quicksilver 19 on the back of prism 5 but, instead of passing onward and upward to the eye of the operator, they are again reflected by a similar reflecting film 99 on the back of the second prism 98 in a horizontal direction to an eye-piece lens 96 set in a horizontal thimble 97 in line with the opening 27ª of the shutter casing 27, and the opening 36 in the back 101 of the main casing. The photographic film is supported and passes between the rear of the shutter casing 27 and the inside face of back 101, as explained in my said co-pending application Serial No. 85,130 and the swinging substantially tubular support 6 for the lower prism 5 permits said prism to be swung down into line with the focal axis of the lens 4 during the finding and focusing operation, and then swung up out of the field of said lens just before the shutter is operated. Support 6 is pivoted at 8 on the base thimble 7 which is attached to the upper wall of the casing.

In this form of camera the objective lens 4 is supported by a carriage 15 which may be pulled out upon the hinged platform 22 when a photograph is being taken, or pushed back into the telescoping section 21 when it is desired to close the camera by folding up the swinging platform 22 and pushing inward the said telescoping section. Telescoping section 21 is prevented from being pulled entirely out of main casing 100 by the rear flange 26 which also cooperates with the cam-faced block 25 carried by spring 24 to hold the telescoping section 21 in extended position, as shown.

In this construction the focal length of lens 96 should be such that its focal plane, as reflected by the mirror surface 99, will coincide with the focal plane of the objective lens 4 when reflected upward by the mirror surface 19. Also the distance from the center of surface 19 to the common reflected focal planes of the two lenses should equal the distance from said center to the plane of the sensitized surface on which the photographic action is to take place when the shutter is opened. That is to say, referring to Fig. 4, distance $P_1-F$ should equal distance $P_1-S$, the lower prism being represented by $P_1$, the upper prism by $P_2$, the sensitized surface of the film by 3, the objective lens by L, eye-piece lens by I, and its normal focal plane by F. Obviously the distance $P_2-F$ should equal that $P_2-F_1$.

The focal plane shutter mechanism (not herein illustrated) may be the same as that illustrated and described in my said copending application, Serial No. 85,129, the curtains forming said shutter moving in front of the shutter retaining frame or casing 27.

$97^a$ is a removable plug seated in an opening in the top of the main casing 100 in line with the swinging prism supporting member 6, which plug supports the second prism 98. This plug $97^a$ and prism 98 may be removed as a unit for purpose of cleaning the prism faces. Also, if it is desired to use only a single prism, an eye-piece lens may be substituted for prism 98, as shown in my copending application Serial No. 85,128, of which this application is a division.

The horizontal sliding bar 10, is operated by a spiral spring 12 (as indicated in Fig. 2) to oscillate the swinging member 6, as described in my last above mentioned copending application.

Considering the essential elements of the above described structure it is apparent that the magnifying lens 96 corresponds to the eye-piece of a reflecting telescope, the adjustable lenses 4 correspond to the adjustable lenses or object glass of such telescope, and that the path of the light rays through said lenses 4 and 96 is bent twice at right angles by the films of light-reflecting material 19 and 99 applied to the rear faces of prisms 5 and 98. The planes of the reflecting surfaces so formed are, as shown, inclined 45 degrees to the axes of both lenses 4 and 96, and the cross sections of said prisms 5 and 98 are preferably that of a right-angled isosceles triangle with the reflecting films 19 and 99 applied to their faces which form the bases of the isosceles triangles, as shown in Fig. 4.

In operating the camera the user sets the shutter and swings prism 5 down into the position shown in Fig. 2, with the mirror surface 19 in the focal axis of the objective lens 4. This swinging motion may be produced by means of sliding bar 10, and distends spring 12, the parts being then locked in the position shown by any simple device. The operator next looks through lenses 96 and 4 as through a telescope at the object or objects to be photographed, focusing lens 4 in the usual manner so as to give him a clear view of them. This means that lens 4 is thereby so focused that a similar sharply defined image of the object in its field will be thrown on the sensitized surface of plate or film at the rear of the camera casing whenever prism 5 is swung out of the way and the camera shutter is operated to produce the desired exposure. The instant this focusing is accomplished satisfactorily the operator releases bar 10, spring 12 snaps swinging member 6 to one side, the shutter is simultaneously operated by any suitable mechanism and the desired exposure effected.

Among the advantages of my invention may be mentioned the following: While the camera may be made of small size and very compact when collapsed, the telescopic finding and focusing apparatus described enables the operator to accurately focus lenses 4, without the use of any ground glass screen. Also he does this without having to estimate the distance and then focus the lens approximately for that distance by rule, as is the case with ordinary pocket cameras. The use of the prisms with the reflecting films 19 and 99 on their inclined surfaces produces a clear reflection of the image to the eye of the operator, there being no double reflection as is usually the case when an ordinary inclined mirror is used for this purpose, the front surface of such mirror producing one reflection and the reflecting surface on its back another. The vertical face of the prism 5 through which the rays of light enter being at right angles to said rays and the horizontal faces and the vertical face of prism 98 through which the reflected rays pass to the eye-piece 96, being also at right angles to said reflected rays, there is no refraction of these rays either when entering or when leaving the prisms. The mounting of the lower prism on a swinging member used as a part of the finding mechanism and movable in a plane parallel to the sensitized surface reduces the space occupied by this portion of the apparatus to the smallest possible amount. The use of the two prisms permits putting the eye-piece lens in the back of the camera so that the operator holds the camera up before his face while standing erect to take the picture, instead of having to hold it in front of his body while bending over it as is the case when he has to look through an opening in the top of the casing. This reduces the liability of his causing involuntary movements of the camera between focusing and exposure, because breathing and heart action are freer in the erect position and less likely to be transmitted to the hands holding the camera. Also focusing in this erect position can be done without attracting attention from bystanders, and a clear view can be obtained over the heads of surrounding crowds, both which points are advantageous in detective work.

Various changes evidently could be made in the details of the particular embodiments of the various sub-combinations herein illustrated and described without departing from the principle of the invention so far as the general method of operation and cooperation herein indicated is preserved.

Having described my invention, I claim:

1. In a camera comprising a casing having an aperture in its rear wall, an objective lens, and a support for a sensitized surface coincident with the focal plane of said objective lens, the combination, with the above recited apparatus, of a mirror movable into, and away from, the focal axis of said lens in front of said sensitized surface support and inclined to said axis, a second lens located in line with said aperture, and additional reflecting means separated from said first mentioned mirror only by an open air space extending between them and so inclined as to cause the focal plane of light rays passing through said second lens to coincide with the focal plane of the objective lens at a point in said open air space, when the image of an exterior object is reflected by said first mentioned mirror to said point.

2. A combination such as defined in claim 1 in which said mirror is formed by a film of reflecting material applied to the widest face of a glass prism having a cross section in the shape of a right-angled isosceles triangle, one of the other and shorter faces of which prism is perpendicular to the axis of the said objective lens.

3. A combination such as defined in claim 1 in which said mirror is formed by a film of reflecting material applied to the widest face of a glass prism having a cross section in the shape of a right-angled isosceles triangle, one of the other and shorter faces of which prism is perpendicular to the axis of the said objective lens, and in which said last mentioned reflecting means comprises a similar prism, one of the shorter faces of which is perpendicular to the axis of said second lens.

4. In a camera comprising a casing having an aperture in its rear wall, an objective lens mounted on the front of said casing, and means adapted to maintain in the back portion of said casing a sensitized surface coincident with the focal plane of said objective lens, the combination, with the above recited apparatus, of a second lens located in the line of said aperture in the back wall of said camera casing, two inclined mirrors separated only by an open air space and so inclined as to bring by their conjoint action the focal planes of said lenses into coincidence in said open space, and means for moving one of said mirrors, into, and out of, the field of said objective lens.

5. A combination such as defined in claim 4 in which said movable mirror swings in a plane parallel to the sensitized surface.

6. A combination such as defined in claim 4 in which said second lens lies approximately in the plane of said sensitized surface.

7. A combination such as defined in claim 4 in which each of said mirrors consists of a film of reflecting material applied to one face of a glass prism.

8. In a camera comprising a casing having an aperture in its rear wall, an objective lens, and a support for a sensitized surface coincident with the focal plane of said objective lens, the combination, with the above recited apparatus, of a second lens located within the casing in line with said aperture, a mirror located in the field of said second lens and inclined to the focal axis thereof, a substantially tubular member having an unobstructed passage for light rays therethrough pivoted about said mirror on an axis substantially parallel to said lens axis, and a second mirror mounted at the free end of said pivoted member inclined to the focal axis of said objective lens and adapted to be swung with said member into and out of the field of said objective lens, said lenses being so designed that the light rays projected through each will, when reflected respectively by said mirrors, meet in a common focal plane in the interior of said pivoted member.

9. A combination such as defined in claim 8 in which said mirrors comprise films of light reflecting material applied to the faces of glass prisms.

10. In a camera having a finding and focusing apparatus comprising an inclined mirror adapted to swing into and out of the field of the objective lens, the combination, with the above recited elements, of a second mirror mounted on a plug adapted to be projected through an opening in the wall of the camera casing into operative relation with the first mentioned mirror, whereby said second mirror may be temporarily removed for cleaning or for replacement by an eyepiece lens.

GEORGE WASHINGTON.